Dec. 30, 1952         E. G. WEBBER              2,623,571
              METHOD OF SPLICING TUBULAR ARTICLES
                     Filed Jan. 19, 1951
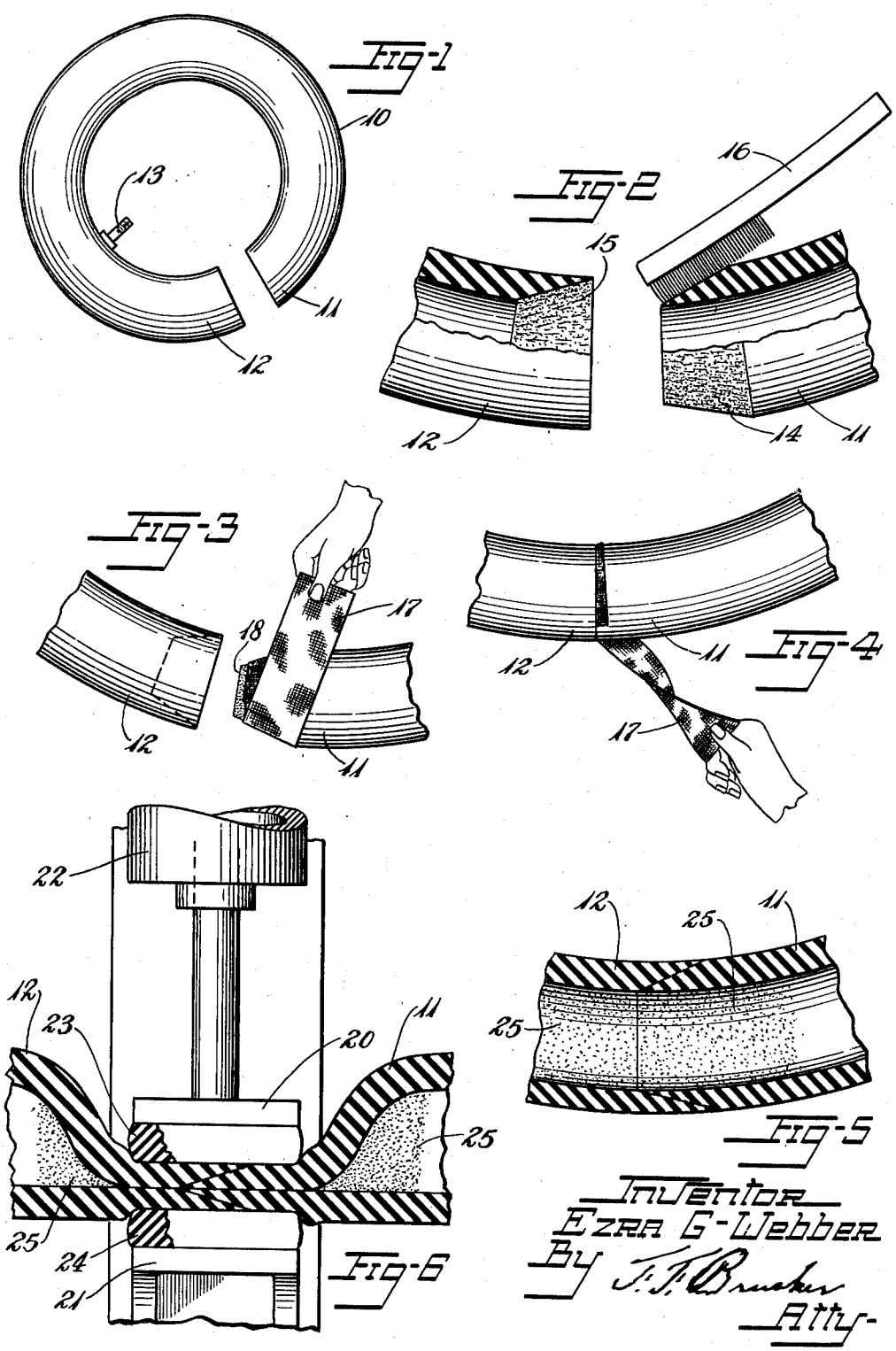

Patented Dec. 30, 1952

2,623,571

UNITED STATES PATENT OFFICE 2,623,571

METHOD OF SPLICING TUBULAR ARTICLES

Ezra Gray Webber, Cuyahoga Falls, Ohio, assignor to The B. F. Goodrich Company, New York, N. Y., a corporation of New York Application January 19, 1951, Serial No. 206,875

5 Claims. (Cl. 154—14)

This invention relates to the splicing of thick-walled tubular rubber articles, such as curing bags employed in applying internal pressure to pneumatic tires during a vulcanizing operation, and is especially useful in splicing bags comprising butyl rubber although the invention is also useful in splicing other tubular articles and bags of other rubber materials.

In the vulcanization of pneumatic tires pressure is applied to the walls of the tire by use of a thick-walled expansible bag of rubber material. Such bags have usually been made by splicing the ends of a length of tubular material. This has been difficult in view of the thickness of the wall and has been more difficult where the tubular material has comprised butyl rubber material.

Objects of the present invention are to provide a superior splice of the tubular material, to provide for shielding adhesive areas of the tubes from contact with each other until in proper position, and to unite the splices progressively.

These and other objects will appear from the following description and the accompanying drawings.

Of the drawings,

Fig. 1 is a side view of an open-ended tube before splicing.

Fig. 2 is an enlarged view of the skived ends of the tube, shown partially broken away and partially in section, illustrating the cleaning step.

Fig. 3 is a view illustrating the step of wrapping the liner of the protective material about the cleaned and prepared end of a tube before assembling the ends.

Fig. 4 is a view showing the step of removing the liner progressively after the tube ends have been placed in assembled position.

Fig. 5 is a similar view showing the splice with the liner removed.

Fig. 6 is a sectional view showing the pressing of the splice.

Referring to the drawings, the numeral 10 designates a tubular body of rubber arranged in annular form and having ends 11, 12 to be spliced. A valve stem 13 for inflating the tube has been applied thereto. The tube may have been formed either by extrusion of a rubber composition or by winding sheet material about a mandrel.

For splicing the ends of the tube to each other, the ends of the tube are skived or beveled, as by the use of a sharp knife, to provide a male beveled portion 14 on the end 11 and a female beveled portion 15 on the end 12 as seen in Fig. 2. After beveling of the ends they are cleaned with a solvent for unvulcanized rubber and roughened on their beveled surfaces by use of a wire brush 16.

Before assembling the ends in telescoping relation, a shield or liner 17 of protective masking material, preferably of cloth in strip form is wound about the male beveled end 11, as seen in Fig. 3, leaving the narrow margin 18 of the bevel exposed. The ends are then assembled, the exposed narrow margin 18 of the end 11 adhering upon contact with the innermost portion of the bevel of the end 12. The liner or shield of protective material which does not adhere readily to the material of the tube ends is then progressively unwound and withdrawn from the joint permitting the ends to be adhered progressively as the liner is withdrawn.

After the liner is withdrawn the spliced ends may be flattened and pressed as between pressing members 20, 21, as seen in Fig. 6 where the member 20 is forced toward the member 21 by a fluid-pressure operated cylinder 22. Pads 23, 24 of vulcanized rubber may be employed to cushion the tube and prevent cutting of it by the pressing members. The inner face of the tube may be protected from sticking together by coating it before splicing with soapstone dust 25 or other separating material.

After pressing, the tube may be placed in an annular curing mold and inflated. It may then be vulcanized by applying heat to the mold.

Variations may be made without departing from the scope of the invention as it is defined by the following claims.

I claim:

1. The method of splicing thick-walled tube ends of unvulcanized rubber material which comprises beveling one of the tube ends at its outer face and beveling the other tube end at its inner face to provide telescoping male and female portions, applying protective masking material over one of the beveled end portions leaving a narrow marginal portion exposed, telescoping the tube ends with the protective material therebetween to adhere the exposed portion in determinate position to the opposite beveled portion, removing the protective material to permit adhesion of the remaining beveled portions, and pressing the splice to unite the material of the ends.

2. The method of splicing thick-walled tube ends of unvulcanized rubber material which comprises beveling one of the tube ends at its outer face and beveling the other tube end at its inner face to provide telescoping male and female portions, treating the beveled portions to provide adhesive surfaces thereof, applying protective masking material over one of the beveled end portions leaving a narrow adhesive marginal portion exposed, telescoping the tube ends with the protective material therebetween to adhere the exposed portion in determinate position to the opposite beveled portion, removing the protective material to permit adhesion of the remaining beveled portions, and pressing the splice to unite the material of the ends.

3. The method of splicing thick-walled tube ends of unvulcanized rubber material which comprises beveling one of the tube ends at its outer face and beveling the other tube end at its inner face to provide telescoping male and female portions, applying a protective masking layer of sheet material over one of the beveled surfaces leaving a narrow adhesive marginal portion of the surface exposed, telescoping the tube ends with the protective material therebetween to adhere the exposed portion in determinate position to the opposite beveled portion, removing the protective material to permit adhesion of the remaining beveled portions, and pressing the splice to unite the material of the ends.

4. The method of splicing thick-walled tube ends of unvulcanized rubber material which comprises beveling one of the tube ends at its outer face and beveling the other tube end at its inner face to provide telescoping male and female portions, cleaning the beveled portions by applying a solvent of unvulcanized rubber material to the surfaces, applying protective masking material over one of the beveled portions leaving a narrow adhesive marginal portion exposed, telescoping the tube ends with the protective material therebetween to adhere the exposed portion in determinate position to the opposite beveled portion, removing the protective material to permit adhesion of the remaining beveled portions, and pressing the splice to unite the material of the ends.

5. The method of splicing thick-walled tube ends of unvulcanized rubber material which comprises beveling one of the tube ends at its outer face and beveling the other tube end at its inner face to provide telescoping male and female portions, cleaning the beveled portions with a solvent of unvulcanized rubber, brushing the cleaned portions with a wire brush, applying protective masking material about the male beveled portion leaving a narrow portion of the surface exposed, telescoping the ends of the tube with the protective material therebetween to adhere the exposed portion in determinate position to the opposite end, removing the protective material progressively to permit progressive adhering contact of the beveled surfaces, and pressing the splice to unite the material of the ends.

EZRA GRAY WEBBER.

REFERENCES CITED

The following references are of record in the file of this patent:

UNITED STATES PATENTS

| Number | Name | Date |
|---|---|---|
| 529,142 | Shaw | Nov. 13, 1894 |
| 1,998,633 | Nichols | Apr. 23, 1935 |
| 2,430,630 | Davis | Nov. 11, 1947 |
| 2,473,784 | Carlin et al. | June 21, 1949 |